United States Patent
Larminy et al.

(10) Patent No.: US 11,827,292 B2
(45) Date of Patent: Nov. 28, 2023

(54) METHOD FOR DETERMINING FRICTION TORQUE

(71) Applicant: JTEKT EUROPE, Irigny (FR)

(72) Inventors: Pierre Larminy, Venissieux (FR); Arnaud Bouchet, Oullins (FR)

(73) Assignee: JTEKT EUROPE, Irigny (FR)

( * ) Notice: Subject to any disclaimer, the term of this patent is extended or adjusted under 35 U.S.C. 154(b) by 0 days.

(21) Appl. No.: 17/859,360

(22) Filed: Jul. 7, 2022

(65) Prior Publication Data
US 2023/0008327 A1    Jan. 12, 2023

(30) Foreign Application Priority Data
Jul. 8, 2021   (FR) ...................................... 21/07407

(51) Int. Cl.
*B62D 5/04*    (2006.01)

(52) U.S. Cl.
CPC ................................. *B62D 5/0481* (2013.01)

(58) Field of Classification Search
CPC ...... B62D 5/0481; B62D 15/025; B62D 6/10; B60W 30/00
See application file for complete search history.

(56) References Cited

U.S. PATENT DOCUMENTS

| | | | | |
|---|---|---|---|---|
| 10,407,092 | B2 * | 9/2019 | Sasaki | ....................... B62D 5/04 |
| 2003/0057011 | A1 * | 3/2003 | Ito | ......................... B62D 5/049 180/446 |
| 2009/0069981 | A1 * | 3/2009 | Barthomeuf | ......... B62D 5/0466 701/42 |
| 2009/0283354 | A1 * | 11/2009 | Matsuda | ................ B62D 5/008 180/446 |
| 2011/0022268 | A1 * | 1/2011 | Kojo | ....................... B62D 5/003 701/41 |

(Continued)

FOREIGN PATENT DOCUMENTS

| | | | | |
|---|---|---|---|---|
| CN | 101028832 | A | * 9/2007 | ............ B62D 5/001 |
| CN | 100575169 | C | * 12/2009 | ............ B62D 5/001 |

(Continued)

OTHER PUBLICATIONS

"Fault tolerant control of electric power steering using robust filter-simulation study;" Cholakkal et al.; 2009 IEEE Vehicle Power and Propulsion Conference (pp. 1244-1249); Sep. 1, 2009. (Year: 2009).*

(Continued)

*Primary Examiner* — Khoi H Tran
*Assistant Examiner* — Jorge O Peche
(74) *Attorney, Agent, or Firm* — Oliff PLC

(57) ABSTRACT

A method for determining a friction torque exerted within a steering column of an electric power steering system, the power steering system comprising a steering column provided with a torsion bar undergoing an instantaneous torsion torque, the steering column being linked to a pinion capable of driving a rack, a torsion bar sensor intended to measure the instantaneous torsion torque, the method comprising an acquisition step, during which at least one value of the friction torque is measured by the torsion bar sensor, the acquisition step being carried out following the reception of a trigger signal, the value of the trigger signal depending on values of conditional variables (VL, A, V, C, $\Delta C$, $\Delta A$).

12 Claims, 4 Drawing Sheets

(56) References Cited

U.S. PATENT DOCUMENTS

| | | | | |
|---|---|---|---|---|
| 2011/0264329 | A1* | 10/2011 | Limpibunterng | B62D 5/0472 701/41 |
| 2012/0029773 | A1* | 2/2012 | Fujita | B62D 6/00 701/41 |
| 2012/0123643 | A1* | 5/2012 | Limpibuntering | B62D 15/025 701/42 |
| 2012/0261209 | A1* | 10/2012 | Shiino | B62D 6/10 702/41 |
| 2013/0311045 | A1* | 11/2013 | Tanimoto | B62D 5/0466 701/42 |
| 2014/0371992 | A1* | 12/2014 | Di Cairano | B62D 5/0463 701/41 |
| 2018/0229734 | A1* | 8/2018 | Tsukamoto | F16H 63/502 |
| 2018/0319425 | A1* | 11/2018 | Swieter | B62D 15/021 |
| 2019/0202454 | A1 | 7/2019 | Komiyama et al. | |
| 2019/0315398 | A1* | 10/2019 | Moreillon | B62D 5/0463 |
| 2019/0331544 | A1* | 10/2019 | Kojo | B60W 10/20 |
| 2020/0108858 | A1* | 4/2020 | Moreillon | B62D 6/08 |
| 2020/0231206 | A1* | 7/2020 | Tsubaki | B62D 5/046 |
| 2020/0398889 | A1* | 12/2020 | Higashi | B62D 3/126 |
| 2021/0122412 | A1* | 4/2021 | Kim | B62D 5/0409 |
| 2022/0097762 | A1* | 3/2022 | Miyake | B62D 5/0481 |
| 2023/0008327 | A1* | 1/2023 | Larminy | G08G 1/166 |

FOREIGN PATENT DOCUMENTS

| | | | | |
|---|---|---|---|---|
| CN | 1898116 | B * | 4/2010 | B60R 16/00 |
| CN | 105531179 | A * | 4/2016 | B62D 15/021 |
| CN | 110422231 | A * | 11/2019 | B60W 10/20 |
| CN | 111278714 | A * | 6/2020 | B62D 15/021 |
| CN | 111301513 | A * | 6/2020 | B62D 5/0463 |
| CN | 112124413 | A * | 12/2020 | B60W 10/20 |
| CN | 112213011 | A * | 1/2021 | G01L 3/00 |
| CN | 110027609 | B * | 8/2021 | B62D 15/0235 |
| CN | 115061459 | A * | 9/2022 | |
| CN | 113619590 | B * | 11/2022 | |
| DE | 102010014707 | A1 * | 10/2010 | B62D 5/0466 |
| DE | 102018203090 | A1 * | 9/2019 | B62D 15/0265 |
| DE | 102006037014 | B4 * | 3/2021 | B62D 15/0235 |
| DE | 102019133025 | A1 * | 6/2021 | B62D 5/0463 |
| DE | 102021208838 | A1 * | 2/2023 | |
| EP | 1291263 | A2 * | 3/2003 | B62D 5/049 |
| EP | 2374693 | A1 * | 10/2011 | B62D 15/025 |
| EP | 3184404 | A2 * | 6/2017 | B62D 5/0409 |
| EP | 3453591 | A1 * | 3/2019 | B62D 15/02 |
| EP | 3569476 | B1 * | 5/2021 | B62D 5/046 |
| ES | 2476995 | T5 * | 1/2018 | B62D 15/025 |
| FR | 3094693 | A1 * | 10/2020 | B62D 15/025 |
| JP | 2003-312512 | A | 11/2003 | |
| JP | 2004149067 | A * | 5/2004 | B60C 23/00 |
| JP | 2004149068 | A * | 5/2004 | B60C 23/00 |
| JP | 2004346991 | A * | 12/2004 | |
| JP | 2005-153779 | A | 6/2005 | |
| JP | 2005153779 | A * | 6/2005 | |
| JP | 2014-202594 | A | 10/2014 | |
| KR | 100440322 | B1 * | 7/2004 | |

OTHER PUBLICATIONS

"Active Return-to-Center Control Based on Torque and Angle Sensors for Electric Power Steering Systems;" Du et al.; Sensors (Basel, Switzerland), 18(3), 855; Mar. 14, 2018. (Year: 2018).*

"Model-Based Condition Monitoring of the Sensors and Actuators of an Electric and Automated Vehicle;" Li et a.; Sensors (Basel, Switzerland), 23(2), 887; Jan. 12, 2023. (Year: 2023).*

Mar. 7, 2022 Written Opinion on the Patentability of the Invention issued in French Patent Application No. FR2107407.

Mar. 7, 2022 Preliminary Search Report issued in French Patent Application No. 2107407.

* cited by examiner

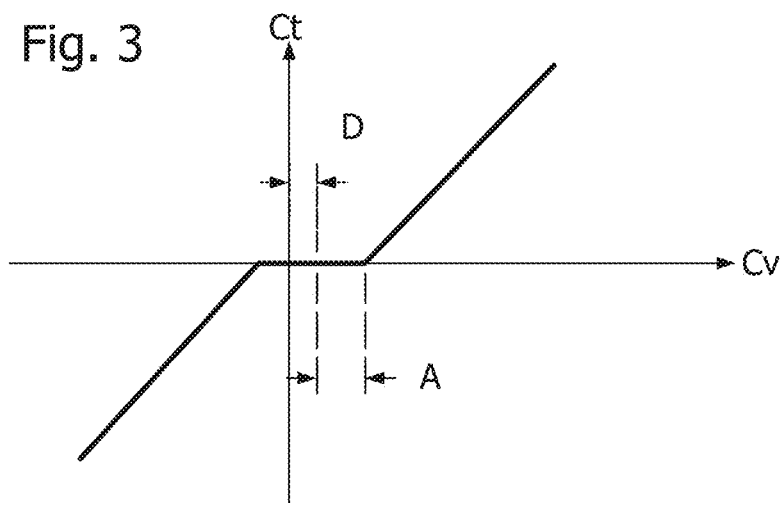
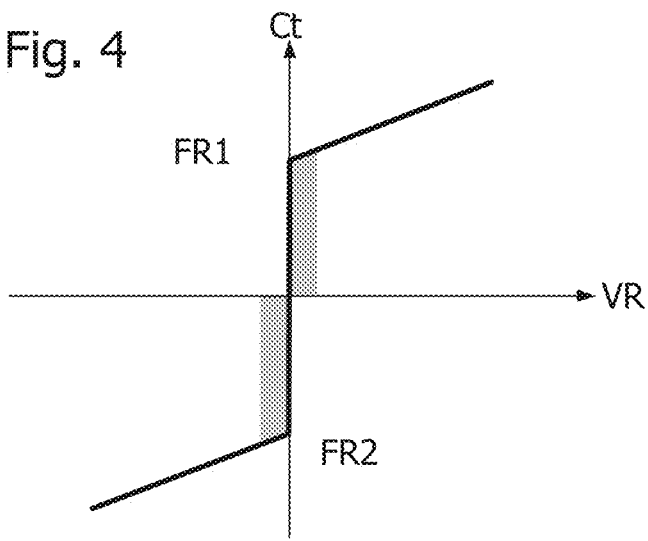

METHOD FOR DETERMINING FRICTION TORQUE

BACKGROUND OF THE INVENTION

Field of the Invention

The present application relates to the field of power steering systems. The present application concerns in particular a method allowing the determination of a friction torque of a steering column within a power steering system.

Description of Related Art

As time goes by and technological advances, the number of automated advanced driver assistance systems (ADAS) increases within vehicles.

Such ADAS are typically electronic systems having access to the restitution (display, indicator lights, loudspeaker, etc.), traction, braking and steering members of the vehicle, thus allowing the driver to benefit from assistance and/or temporarily delegate driving to an automatic co-pilot in certain traffic conditions.

ADAS can be classified into several categories.

Longitudinal control systems make it possible to act on the speed of the vehicle, and comprise, for example, emergency braking assistance, the anti lock braking system (ABS), the limiter or the cruise control.

Parking assistance systems make maneuvering easier for the driver wishing to park the vehicle, and comprise, for example, a reversing radar, a reversing camera, or a device to facilitate automatic parking.

The purpose of lateral control systems is to intervene in the trajectory of the vehicle. There are lateral control systems which operate on the principle of an action on the steering system, for example to assist the driver in keeping the vehicle in a line of traffic. Such systems are also referred to as LKA (Lane-Keeping Assist) systems. Other systems, called electronic trajectory correctors (for example Electronic Stability Program, ESP or Electronic Stability Control, ESC or Dynamic stability control, DSC) act on the engine torque and the brakes, so as to prevent the vehicle from skidding.

The invention relates more particularly to lateral control systems by action on the power steering system. In the remainder of this text, ADAS only refers to lateral control systems by action on the power steering system.

Such lateral control systems have the function of reducing the occurrence of an accident in the event that the driver involuntarily leaves his traffic lane, and moves into an opposite lane or outside the traffic lanes. Typically, such a lateral control system comprises, for example, a detector such as a camera intended to detect any involuntary exit from a traffic lane. If such a situation occurs, the detector transmits the information to an on-board computer, which can give an order to an actuator of the power steering (for example a gear motor) to exert a rotation action in order to allow a pivoting of the wheels. In this way, the direction followed by the vehicle is automatically corrected.

Lateral control systems offer real added value in terms of comfort and safety for the driver of the vehicle.

European regulation (EU) 2019/2144 of Nov. 27, 2019 makes the integration of ADAS in new vehicles mandatory for the coming years.

Although it has undeniable advantages, it has been proven that the use of such ADAS can have the undesired consequence of causing drivers to become less alert. According to a study by the Insurance Institute for Highway Safety (IIHS) and the Massachusetts Institute of Technology (MIT) published on Nov. 19, 2020, it appears that motorists are twice as likely to show signs of inattention after one month of motorway driving with ADAS including lane keeping assistance. Yet, it is known that inattention while driving is responsible for a large number of accidents. As the French Motorway Companies Association has found, almost 20% of fatal accidents on the motorway in 2019 come from the loss of driver attention.

Moreover, current regulations require the driver to remain attentive and responsible for controlling their vehicle (see in particular Highway Code R412-6), authorizing a maximum period of inattention depending on the functionality associated with ADAS, the maximum period of inattention can for example amount to fifteen seconds.

Also, it becomes necessary to equip vehicles with on-board functionalities making it possible to check the vigilance of the driver in order to alert or react in an emergency (modification of the trajectory of the vehicle) in the event of non-reaction of the driver vis-à-vis the requests of the vehicle.

This monitoring can be carried out in particular by capturing images of the driver, for example using one or more cameras located inside the vehicle. It is also possible to detect the presence of an action by the driver on the steering wheel, for example using a sensor detecting the contact of the hand on the steering wheel, or by detecting the presence or not of a mechanical action of the driver on the steering wheel, for example by fitting the steering column with a torque sensor.

Such a torque sensor on the steering column determines the action of the driver on the steering wheel through the estimation of the torque transmitted by the driver to the steering wheel. Knowledge of the driver torque makes it possible to know whether the user has his hands on the steering wheel or not.

In order to determine the torque exerted on the steering column, it is known to arrange a torsion bar between the steering column and the reduction gear of the power steering system. A steering torque is thus measured by placing sensors on the torsion bar. The torque measured does not, however, correspond to the torque exerted by the driver on the steering wheel (referred to below as the driver torque). The driver torque is actually obtained from the value of the steering torque by a calculation, taking into account the various mechanical parameters relating to the steering system, that is to say the inertias, stiffness, and friction torques of the elements arranged between the torsion bar and the steering wheel.

It is important that the driver torque is calculated reliably. Also, the mechanical parameters, namely the stiffness, inertia and friction forming the various elements of the torque measured on the torsion bar must be determined with precision.

The values of the stiffness and inertia of the components of the steering column can be determined with sufficient accuracy to be used directly for the calculation of the driver torque. Conversely, the value of the friction torque is much more difficult to know.

Indeed, such a friction torque value depends on the assembly of the steering column, and changes according to a multitude of factors external to the steering system (for example temperature, state of wear of parts, etc.).

Also, due to such inaccuracy, and in the absence of a sensor on the steering wheel, it is not possible to know with certainty whether or not the driver is in contact with the steering wheel.

By assuming that such a sensor is implemented in a vehicle, it is in any case necessary to ask the driver to confirm the presence of his hands on the steering wheel, for example by alerting the driver audibly, visually or by vibration of the steering wheel. The repetition of such a situation is not satisfactory for the driver in terms of driving comfort, and all the more so in the event of untimely triggering of the steering wheel sensor.

Finally, the steering wheel sensors may experience failures, or errors. Redundancy may then prove necessary, so as to confirm the presence or absence of the driver hands on the steering wheel.

The invention proposes to respond to the aforementioned drawbacks.

A first object is to propose a method for determining the friction forces, and in particular the friction torque exerted on the steering column as a function of external parameters.

A second object is to propose such a method, making it possible to complete or verify information on the presence or absence of the hands of a driver on a steering wheel.

A third object is to propose a computer program product capable of being executed on a memory medium.

A fourth object is to propose a power steering system incorporating such a computer program product.

A fifth object is to propose a vehicle comprising a steering system presented above.

BRIEF SUMMARY

To this end, there is firstly proposed a method for determining a friction torque exerted within a steering column of an electric power steering system of a vehicle, the power steering system comprising a steering column provided with a torsion bar subjected to an instantaneous torsion torque exerted by a reduction gear driven in rotation by a motor, the steering column being linked to a pinion capable of driving a rack, a torsion bar sensor intended to measure the instantaneous torsion torque exerted on the torsion bar, the determination method comprising an acquisition step, during which at least one value of the friction torque is measured by the torsion bar sensor, the acquisition step being carried out following receipt of a trigger signal by an acquisition module, the value of the trigger signal depending on the values of conditional variables.

The determination method makes it possible to know in real time the friction torque exerted on the steering column. In this way, it is possible to confirm whether or not the presence of the driver hands on the steering wheel when the power steering system is in ADAS operation, without it being necessary to request the driver.

Advantageously, the method comprises an analysis step, in which an analysis module receives a state quantity detected by a detection means, the state quantity being associated with a conditional variable evolving between a false and true state, a conditional variable passing to the true state if a condition relating to the state quantity is validated, the analysis module generating a trigger signal when the conditional variable is in the true state, a conditional variable being an information of lack of contact of the user hands on the steering wheel, an absolute value of the angle of rotation of the pinion, an absolute value of the speed of rotation of the pinion, a torque, a variation of torque, a variation angle between two extremums of torque.

Advantageously, a first conditional variable is true if the information that the released steering wheel is true, and/or a second conditional variable is true if the pinion angle absolute value is less than a predetermined threshold value in which a misalignment of the center flywheel relative to the axis of rotation does not disturb the measurement, and/or a third conditional variable is true if the absolute value of the rotational speed of the pinion is less than a predetermined threshold value in which the possibly viscous friction do not disturb the measurement, and/or a fourth conditional variable is true if the torsion torque values measured in a predetermined time interval are comprised between a minimum value and a maximum value, the values being defined so as to define a range within which the torque value is considered consistent, a fifth conditional variable is true if the variation of the torsion torques measured in a predetermined time interval is less than a reference variation value corresponding to a sufficiently low torsion torque variation value to be considered as stable, a sixth conditional variable is true if the absolute value angle variation between two extremums is greater than a value, making it possible to ensure that the torsion torque is stable.

Advantageously, during the acquisition step, a first friction value is recorded when the torsion torque is exerted in a first direction, and a second friction value is recorded when the torsion torque is exerted in a second direction, the second direction being opposite to the first direction, the acquisition module performing the calculation of an offset, and of an average friction torque respectively calculated as follows:

$$D = \frac{FR1 + FR2}{2} \qquad [\text{Math1}]$$

$$FR = \frac{|FR1 - FR2|}{2} \qquad [\text{Math 2}]$$

According to one embodiment, during the acquisition step, a contextual quantity is measured simultaneously with a friction torque value.

Advantageously, a contextual quantity is an ambient temperature, a distance traveled by the vehicle, a duration of use of the power steering system.

Advantageously, the determination method comprises a storage step, during which values of the first friction torque and of the second friction torque, as well as an associated contextual quantity are stored, the storage step being carried out if the values of the first friction torque and of the second friction torque have been acquired during the acquisition step in a predetermined time interval.

Secondly, a computer program product implanted on a storage medium comprising instructions which, when executed on a computer device, implement the control of the determination method is proposed.

Thirdly, an electric power steering system comprising such a memory medium is proposed.

Fourthly, a vehicle incorporating the power steering system presented above is proposed.

BRIEF DESCRIPTION OF THE DRAWINGS

Other characteristics and advantages of the invention will appear more clearly and concretely on reading the following description of embodiments, which is made with reference to the appended drawings in which:

FIG. 3 schematically represents a graph illustrating the evolution of the torque of the torsion bar as a function of the driver torque when the steering wheel is held by the driver;

FIG. 4 schematically represents a graph illustrating the evolution of the torque of the torsion bar as a function of the evolution of the rotation speed of a rack pinion;

DETAILED DESCRIPTION

Figure 1:
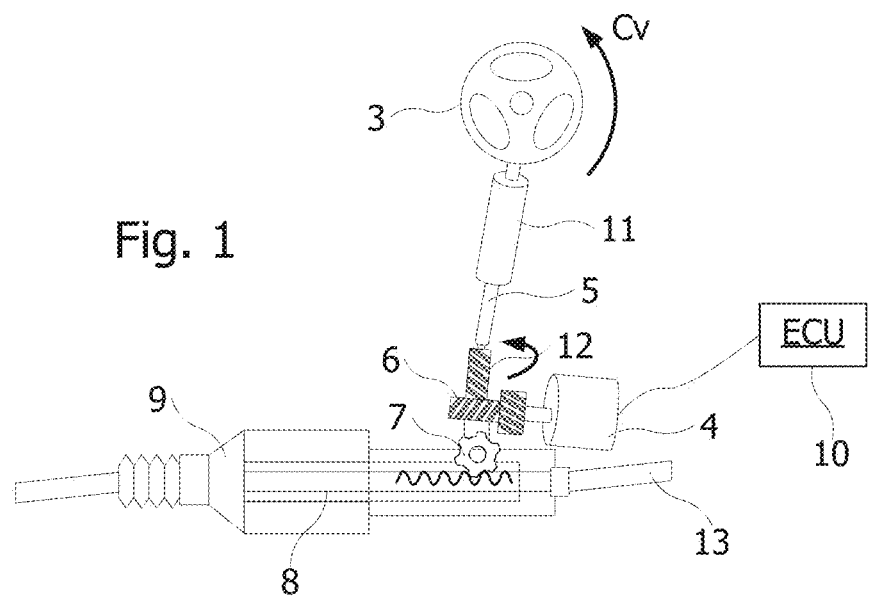
FIG. 1 represents an overall schematic view of a power steering system.

Reference is made to FIG. 1 representing an electric power steering system 1 (designated power steering system throughout the rest of this text) provided with a determination system 2 allowing the determination of a friction torque FR1, FR2.

A motor vehicle (not shown) incorporates for example such an electric power steering system 1.

By motor vehicle, reference is made to any motorized vehicle equipped with four wheels and intended to run on a road infrastructure, for example a passenger car, a truck, or a coach bus.

The power steering system 1 aims to facilitate the manipulation of a directional steering wheel 3 by allowing the application of a torque Cm produced by a rotating shaft of a motor-computer 4 applied to the steering column 5 via a reducer 6.

The steering column 5 advantageously carries the steering wheel 3 at a first upper end. The steering wheel 3 allows the transmission to the steering column 5 of a driver torque Cv.

Advantageously, at a lower end, the steering system 1 comprises a steering pinion 7 intended to be engaged on a rack 8, favorably housed within a casing 9. The application of a torque by the steering column 5 on the steering pinion 7 has the effect of allowing the translation of the rack 8, which causes the rotation of the wheels of the vehicle (not shown in the figures) by means of rods 10 articulated at the ends of the rack 8.

The motor-computer 4 comprises an electric motor, for example a brushless motor (not visible in the figures), which is driven by an electronic control unit or ECU (not visible in the figures), such as an electronic card.

The motor-computer 4 generally has the function of allowing a motor-calculator torque Cm to be exerted on the steering column 5. Such a computer torque Cm is intended to be added to the driver torque Cv on the steering column 5, the power steering system 1 being in assisted operating mode.

When the driver does not exert any torque Cv on the steering wheel, such a motor-computer torque Cm replaces the driver torque Cv, the power steering system 1 being in ADAS operating mode.

The steering system 1 comprises a torsion bar 11, for example positioned between the steering column 5 and the reducer 7. Such a torsion bar 11 is intended to be deformed by the rotational movement of the steering column 5 following the exercise of a driving torque Cv or by the movement of the pinion 7 on the rack 8 following the exercise of a motor-computer section Cm, or of a force feedback from the rack 8 following the action of the road on the steering system 1.

The deformation of the torsion bar 11, measured by a sensor 12 of the torsion bar arranged on the torsion bar 11 makes it possible to measure the torque Ct of the torsion bar.

The values recorded by the sensor 12 of the torsion bar are communicated to the ECU 10, allowing the servo-control of the motor-computer 4. Thus, such a measurement makes it possible, for example, to determine the motor-computer torque Cm, exerted in assistance of the driver torque Cv.

Figure 2:
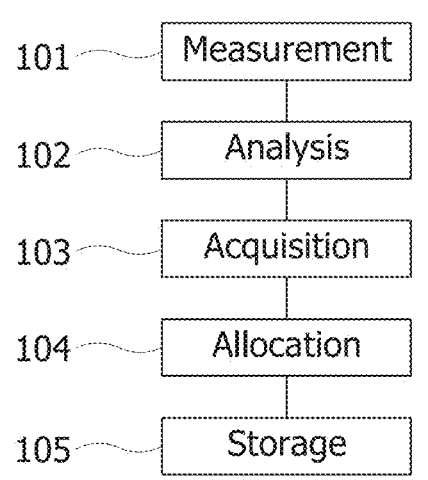
FIG. 2 represents a flowchart illustrating a method for determining a steering column friction torque.

As shown in FIG. 2, the torsion bar torque Ct does not change immediately in response to a driver torque Cv due to a friction torque FR1, FR2 which opposes the movement of the user. Such a friction couple FR1, FR2 is linked in particular to the friction of the various elements forming the steering column 5.

When the user exerts a conductive torque Cv going in a first direction, for example left, then a first friction torque FR1 is exerted against the conductive torque Cv. When the user exerts a conductive torque Cv going in a second direction, for example right, then a second friction torque FR2 is exerted against the conductive torque Cv. Also, the first friction torque FR1 and the second friction torque FR2 have opposite signs, for example the value of the friction torque FR1 is positive and the value of the second friction torque FR2 is negative.

The values of the friction torque FR1, FR2 can be read using sensor 12 of the torsion bar. Knowledge of such friction values makes it easier to control the steering system 1 in ADAS operation.

It has been noted that in the absence of action by the driver on the steering wheel 3, and at constant speed, the torque Ct measured by the torsion bar sensor 12 corresponds to the friction torques FR1, FR2 as is illustrated in FIG. 3. Such a property is used for determining the friction torque FR1, FR2 by a method for determining a torque FR1, FR.

Now an example of such a method for determining a couple FR1, FR will be described, and for this, reference is made to FIGS. 4 to 7.

The flowchart describes an example of the progress of the different steps of the determination method 100, namely a measurement step 101, an analysis step 102, an acquisition step 103, an allocation step 104, a storage step 105. Although described sequentially, the order of execution of the steps of the determination method is not limiting.

The method for determining a torque FR1, FR enables the power steering system 1 to empirically determine the values of friction torques FR1, FR2 of the steering column 5, following the reception of trigger signals DF. The value of the trigger signal DF depends on the state of conditional variables VL, A, V, C, ΔC, ΔA which reflect the state of the power steering system 1, as specified later in this description.

Advantageously, the values of the friction torques FR1, FR2 are associated with contextual quantities T, TD, TU, reflecting the state of the power steering system 1 or the external conditions. This allows the formation of databases associating the pairs FR1, FR2 with such contextual quantities.

Advantageously, the databases thus constituted are used as such in the power steering system 1, for example to improve the reliability of driving in ADAS operation, taking into account the aging of the components forming the power steering system 1.

The data collected is used, for example, for statistical purposes in the design of the power steering system 1.

The different steps of the determination method will now be detailed.

In the analysis step 102, conditional variables VL, A, V, C, ΔC, ΔA are detected by a detection means, then analyzed by the analysis module 13. The analysis step 102 makes it possible to place oneself in optimal conditions to allow the acquisition of friction torque values FR1, FR2 that are as reliable as possible.

The conditional variables VL, A, V, C, ΔC, ΔA, which evolve for example between a true or false state, reflect the validation of operating conditions of the power steering system 1, and in particular have a role of trigger to carry out the acquisition step 103.

The state of the conditional variables VL, A, V, C, ΔC, ΔA depends on the value of state quantities IVL, θ, VR, Ct, ΔCt, Δθ measured by a detection means (not visible in the figures), which detection means is known to those skilled in the art.

Examples of conditional variables VL, A, V, C, ΔC, ΔA and state quantities IVL, θ, VR, Ct, ΔCt, Δθ are detailed below.

Figure 5:
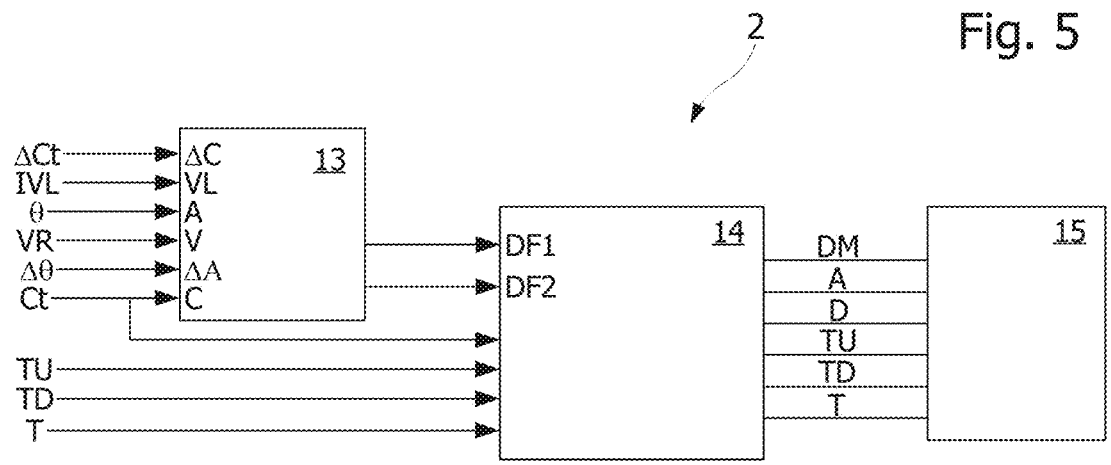
FIG. 5 is a functional schematic representation of the system for determining a friction torque.

In the embodiment represented in FIG. 5, a first conditional variable VL depends on the information that the steering wheel is free. The first conditional variable VL has for example the value «1», or «true» if the user does not have his hands on the steering wheel. The first conditional variable VL is for example detected by means of a steering wheel sensor mounted on the steering wheel 3, such as a touch sensor (not shown), which sends back information about the released steering wheel IVL. The absence of the hands on the steering wheel 3 corresponds to a situation in which the friction torque is determinable, as explained above, and is therefore favorable for enabling the acquisition step 103 to be carried out.

In the embodiment represented in FIG. 5, a second conditional variable A depending on the information according to which an absolute value of the angle θ of rotation of the pinion 7 is less than a reference angle of rotation value of the pinion θ_ref. The reference angle of rotation value θ_ref of the pinion 7 is a predefined value beyond which the imbalance of the center of inertia of the steering wheel with respect to the center axis of rotation of the steering wheel 3 is liable to generate an error at the level of the measurement of the friction torque FR1, FR2. Such a reference angle θ_ref is for example defined as being at 20°.

The measurement of the rotation angle θ of the pinion 7 is advantageously performed by a dedicated sensor (not shown).

The conditional variable A is advantageously of the all or none type, and has the state «1» for example if the absolute value of the rotation angle θ of the pinion 7 is less than the value of the reference rotation angle of the pinion θ_ref, and «0» or «false» otherwise.

In the embodiment represented in FIG. 5, a third conditional variable V carries information whether or not an absolute value of the rotation speed VR of the pinion 7 is less than a reference speed Vref.

Preferably, the value of the rotation speed VR of the pinion 7 as measured, is corrected by the use of low-pass filtering, for example at 20 Hz, making it possible to remove from the measurement values read at too high frequency, which can distort the measurement.

In order to be placed in optimal acquisition conditions, the value of the reference rotation speed Vref of the pinion is the speed beyond which the viscous forces linked to the movement of the steering column 5 can no longer be considered as negligible. An example of reference speed Vref is 10°/s.

The third conditional variable V is advantageously of the all or none type, and has the value «1» as an example if the absolute value of the rotation speed VR of the pinion 7 is less than a reference speed Vref or not, and «0» or «false» otherwise.

Advantageously, the rotation speed VR of the pinion 7 is obtained by deriving a rotation angle value θ of the pinion 7, measured for example using a dedicated sensor. However, such a measurement of the rotation angle θ turns out to be subject to noise with regard to the orders of magnitude of the other measured variables, making obtaining the speed by such a method complex.

In the embodiment represented in FIG. 5, a fourth conditional variable C reflects a condition according to which the torsion bar torque Ct has a sufficiently stable value to avoid the occurrence of measurement errors generated by adhesion/slip phenomena (also known as sticking/unsticking, or stick/slip) of the steering column 5. Such transient stick/slip phenomena occur at very low steering wheel speed when the steering column 5 slides within its support. The jerky movements observed during these sticking/unsticking phenomena generate parasitic noises which disturb the measurements.

In the embodiment represented in FIG. 5, a fifth conditional variable ΔC reflects a condition according to which the variation in torsion bar torque ΔCt, that is to say the difference between two successive torque values of the torsion bar 11 has a sufficiently low value to avoid the occurrence of measurement errors generated by adhesion/slip phenomena (also known by the name sticking/unsticking, or stick/slip) of the steering column 5. Such transient stick/slip phenomena of, occur at very low steering wheel speed during the sliding of the steering column 5 within its support. The jerky movements observed during these sticking/unsticking phenomena generate parasitic noises which disturb the measurements.

A sufficient stability is for example observed when a difference between the minimum and maximum value of the torsion bar torque Ct, measured during a predefined time interval is below a reference value. Typically, the reference value is 0.2 Nm, measured over a time range in the range of a few milliseconds.

When sufficient stability is observed, according to the criterion defined above, the fourth conditional variable V advantageously of the all or none type, and has the value «1» or a «true» state, and «0» or a «false» state otherwise.

Figure 6:
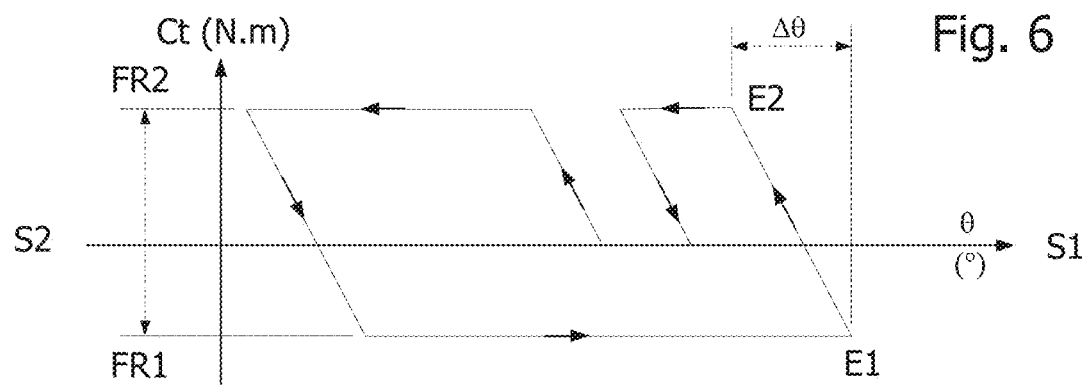
FIG. 6 is a schematic graph illustrating the torque of the torsion bar as a function of the evolution of the angle of a rack pinion.
Figure 7:
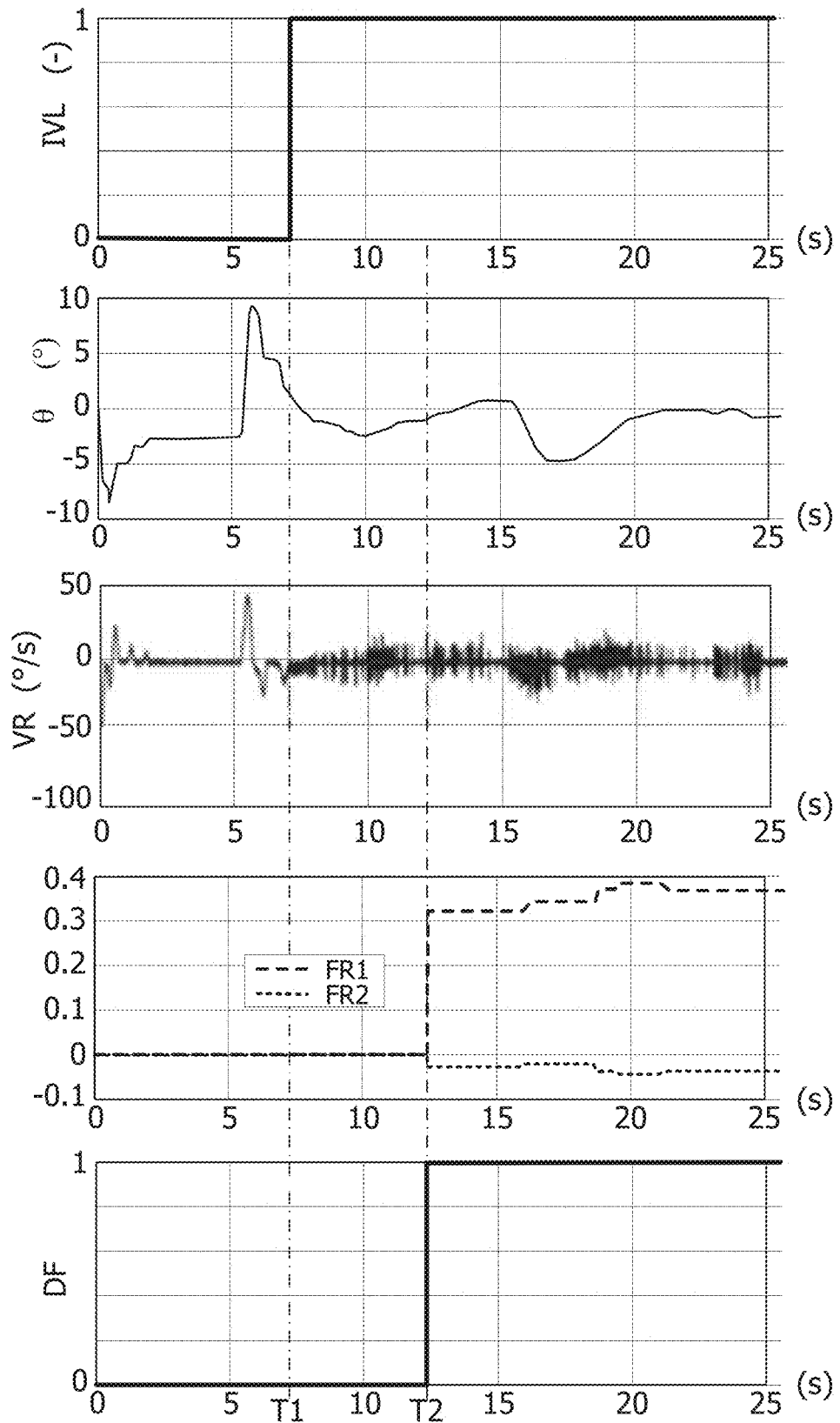
FIG. 7 represents a plurality of temporal graphs showing the evolution of conditional variables, and of friction torques determined by the method for determining a friction torque.

In the embodiment represented in FIG. 6, a sixth conditional variable ΔA reflects a condition according to which the absolute value of angle variation Δθ between two extremums is greater than a value Δθ_ref. This ensures that the torsion torque Ct is stable.

As represented in FIG. 6, a first extremum E1 of torque Ct is reached when the geared motor 4 drives the torsion bar 11 in a first direction S1, which corresponds to FR1. When a second torque extremum E2 is reached when the geared motor 4 drives the torsion bar 11 in a second direction S2, the sixth conditional variable ΔA takes the value «1» or the state «true» because the angle variation Δθ is greater than Δθ_ref.

Preferably, the conditional variables presented above are combined, so as to make it possible to be placed in the most representative possible conditions to trigger the acquisition of a measurement of a friction torque FR1, FR2. Such a situation corresponds to the situation where all the measurement conditions are validated, that is to say all the conditional variables VL, A, V, C, ΔC, ΔA have for example the value «1» or the «true» state.

In an analysis step 102, an analysis module 13 receives the various conditional variables VL, A, V, C, ΔC, ΔA, and depending on their value delivers a trigger signal DF1, DF2.

Advantageously, the analysis module 13 delivers a first trigger signal DF1, the function of which is to give the order to an acquisition module 14 to carry out an acquisition of the friction torque FR1 acting in a first direction S1, and/or the analysis module 13 delivers a second trigger signal DF2, the function of which is to give the order to an acquisition module 14 to carry out an acquisition of the friction torque FR2 exerted in a second direction S2. In this way, during the acquisition step 103, the direction of the measured friction torque FR1, FR2 is determined.

During the acquisition step 103, following the reception of a signal on one of the inputs DF1, DF2, the acquisition module 14 acquires the value of the instantaneous torque Ct. Depending on whether the signal is received on a first input DF1, and/or a second input DF2 determines whether it is a friction torque value FR1 in a first direction S1 or a second friction torque FR2 in a second sense S2.

Advantageously, during an analysis step 102, the acquisition module 14 determines an offset D, as well as an average friction torque value FR. The analysis step 102 is performed when a first friction couple FR1 and a second friction couple FR2 have been acquired, the friction couples FR1, FR2 having been acquired in opposite directions.

The offset D corresponds to the theoretical torque value of the torsion bar, zero if no friction is exerted, and is obtained by the following formula:

$$D = \frac{FR1 + FR2}{2} \quad \text{[Math3]}$$

Such an offset D makes it possible to perform a correction in the case where the first friction torque FR1 and the second friction torque FR2, normally symmetrical with respect to each other, are measured with different values. Such an asymmetry, caused by a measurement error, is thus corrected.

The average friction torque FR is advantageously determined during the analysis step 102 as follows:

$$FR = \frac{|FR1 - FR2|}{2} \quad \text{[Math 4]}$$

The use of the parameters A and FR facilitate the exploitation of the measured friction values FR1, FR2.

In order to allow situational data collection, during the acquisition step 103, contextual quantities T, TD, TU are measured simultaneously with the acquisition of the friction couples FR1, FR2, in particular the temperature T, the distance traveled TD by the vehicle, the time of use TU of the power steering system 1. Such contextual quantities T, TD, TU are associated with the friction torque values FR1, FR2 acquired in an assignment step 104.

Independently of the performance of the assignment step 104, the collected data, in other words the values of friction torque FR1, FR2, and/or the offset D, and/or the average value of the friction torque FR, assigned or no, the contextual quantities T, TD, TU can be stored in a storage module 15 during a storage step 105, following receipt of a storage request signal DM sent by the acquisition module 14 to the storage module 15.

Advantageously, such a storage step 105 is performed when, in a predetermined time interval t, the first torque value FR1 and the second torque value FR2 have been acquired.

The storage of the data offers in particular the possibility of immediate reuse in real time by the ECU 10 in the servo-control or the piloting of the power steering system, for example in ADAS operation.

The storage of the data can for example be used for the realization of statistics allowing to know the influence of the contextual quantities T, TD, TU on the friction of the torsion bar, in particular for the construction of charts.

An example of the operation of the determination method as described above, with reference to FIG. 7, representing graphs are drawn during the execution of a method using all the variables conditional VL, A, V, C, ΔC, ΔA shown above, will now be described.

Thus, it can be seen that before the lapse of a first period of time T1, the first conditional variable VL is at 0, the user keeps his hands on the steering wheel, so that the acquisition step 103 cannot be carried out.

When the user hands leave the steering wheel at time T1, the first conditional variable VL changes to «1», the torque Ct is considered sufficiently stable for the second conditional variable to also take the value «1». At this moment, the conditions allowing the other conditional variables to take the value «1» or «true» are present, so that an acquisition of a first friction torque FR1 is possible.

It should be noted that no value of second friction torque FR2 is acquired, because the condition relating to the sixth conditional variable ΔA, namely the presence between extremums of a sufficiently large angular variation Δθ is not verified.

At time T2, a sufficiently large angular variation Δθ is observed for the sixth conditional variable ΔA to take the value 1. The other state values also having the value «1» or «true», it can be achieved the acquisition of the second friction torque FR2.

The determination method described above is advantageously recorded on a memory medium (not shown), and is for example executed via a computer or electronic means, such as an ECU.

The determination method described above finds an interesting application for any vehicle fitted with a power steering system 1, in particular for a motor vehicle.

The determination method offers many advantages in particular:
- the empirical but precise determination of the friction torque FR1, FR2 exerted on the steering column 1,
- the determination of the friction torque FR1, FR2 without it being necessary to install an additional sensor,
- the possible use of the data in real time by the power steering system 1, in ADAS operation, and/or for subsequent statistical use.

The invention claimed is:

1. A method for determining a friction torque exerted within a steering column of an electric power steering system of a vehicle, wherein the method is implemented in a processing unit embedded in the vehicle and comprises:
   receiving state variables from the vehicle;
   determining conditional variables, each conditional variable being determined as a function of one of the state variables;
   activating a trigger signal as a function of values of the conditional variables; and
   during an acquisition time interval subsequent to the activating of the trigger signal, acquiring at least one value of the friction torque measured by a torsion bar sensor measuring instantaneous torsion torque exerted on a torsion bar equipping the steering column linked to a pinion driving a rack of the power steering system, the power steering system being actuated manually by a steering wheel and by a reduction gear driven in rotation by a motor, and wherein the conditional variables comprise at least two of:

a first conditional variable which is true when no contact of user's hands on the steering wheel is detected, a second conditional variable which is true when a pinion angle absolute value is less than an angle threshold value from which a misalignment of a center of inertia of the steering wheel disturbs the measurement of the friction torque, a third conditional variable which is true when a rotation speed absolute value of the pinion is less than a speed threshold value corresponding to a value from which a friction disturbs the measurement of the friction torque, a fourth conditional variable which is true when the measured torsion torque values in a first measurement time interval are in a torque range within which the torsion torque value is considered consistent, a fifth conditional variable which is true when a torque variation of the torsion bar measured in a second measurement time interval is less than a reference variation value defining a stable torsion torque, and a sixth conditional variable which is true if an angle variation absolute value of the pinion between two torque extremumes is greater than an angle variation threshold value, corresponding to a stable torsion torque.

2. The method of claim 1, further comprising:

recording a first friction torque value when the torsion torque is exerted in a first direction; and recording a second friction torque value when the torsion torque is exerted in a second direction, the second direction being opposite the first direction.

3. The method of claim 2, further comprising calculating an offset value and an average friction torque, as follows:

$$D = \frac{FR1 + FR2}{2}, \text{ and}$$

$$FR = \frac{|FR1 - FR2|}{2},$$

wherein:

D is the offset value,

FR is the average friction torque,

FR1 is the first friction torque value, and

FR2 is the first friction torque value.

4. The method of claim 1, further comprising measuring at least one of contextual vehicle quantities simultaneously with a value of the friction torque, the vehicle contextual quantities comprising an ambient temperature, a distance traveled by the vehicle, and a duration of use of the power steering system.

5. The method according to claim 4, further comprising storing the values of the friction torque acquired during the acquisition time interval, as well as the measured vehicle contextual quantity.

6. A non-transitory computer-readable medium having stored thereon computer-readable instructions that, when executed by a processor, cause the processor to execute a method comprising:

receiving state variables from a vehicle;

determining conditional variables, each conditional variable being determined as a function of one of the state variables;

activating a trigger signal as a function of values of the conditional variables; and during an acquisition time interval subsequent to the activating of the trigger signal, acquiring at least one value of a friction torque measured by a torsion bar sensor measuring instantaneous torsion torque exerted on a torsion bar equipping a steering column linked to a pinion driving a rack of the power steering system, the power steering system being actuated manually by a steering wheel and by a reduction gear driven in rotation by a motor, wherein the conditional variables comprise at least two of:

a first conditional variable which is true when no contact of user's hands on the steering wheel is detected, a second conditional variable which is true when a pinion angle absolute value is less than an angle threshold value from which a misalignment of a center of inertia of the steering wheel disturbs the measurement of the friction torque, a third conditional variable which is true when a rotation speed absolute value of the pinion is less than a speed threshold value corresponding to a value from which a friction disturbs the measurement of the friction torque, a fourth conditional variable which is true when the measured torsion torque values in a first measurement time interval are in a torque range within which the torsion torque value is considered consistent, a fifth conditional variable which is true when a torque variation of the torsion bar measured in a second measurement time interval is less than a reference variation value defining a stable torsion torque, and a sixth conditional variable which is true if an angle variation absolute value of the pinion between two torque extremumes is greater than an angle variation threshold value, corresponding to a stable torsion torque.

7. An electric power steering system comprising:

a steering column provided with a torsion bar undergoing an instantaneous torsion torque exerted by a reduction gear driven in rotation by a motor, the steering column being linked to a pinion driving a rack, a torsion bar sensor for measuring the instantaneous torsion torque exerted on the torsion bar, a steering wheel for manually actuating the power steering system, and a processing device configured to:

receive state variables from a vehicle;

determine conditional variables, each conditional variable being determined as a function of one of the state variables;

activate a trigger signal as a function of values of the conditional variables; and during an acquisition time interval subsequent to the activating of the trigger signal, acquire at least one value of a friction torque measured by a torsion bar sensor measuring instantaneous torsion torque exerted on a torsion bar equipping the steering column linked to a pinion driving a rack of the power steering system, the power steering system being actuated manually by a steering wheel and by a reduction gear driven in rotation by a motor, wherein the conditional variables comprise at least two of:
a first conditional variable which is true when no contact of user's hands on the steering wheel is detected,
a second conditional variable which is true when a pinion angle absolute value is less than an angle threshold value from which a misalignment of a center of inertia of the steering wheel disturbs the measurement of the friction torque,
a third conditional variable which is true when a rotation speed absolute value of the pinion is less than a speed threshold value corresponding to a value from which a friction disturbs the measurement of the friction torque,
a fourth conditional variable which is true when the measured torsion torque values in a first measurement time interval are in a torque range within which the torsion torque value is considered consistent,
a fifth conditional variable which is true when a torque variation of the torsion bar measured in a second measurement time interval is less than a reference variation value defining a stable torsion torque, and
a sixth conditional variable which is true if an angle variation absolute value of the pinion between two torque extremums is greater than an angle variation threshold value, corresponding to a stable torsion torque.

8. The electric power steering system of claim 7, wherein the processing device is further configured to:
record a first friction torque value when the torsion torque is exerted in a first direction; and
record a second friction torque value when the torsion torque is exerted in a second direction, the second direction being opposite the first direction.

9. The electric power steering system of claim 8, wherein the processing device is further configured to calculate an offset value and an average friction torque, as follows:

$$D = FR1 + FR2/2, \text{ and}$$

$$FR = |FR1 - FR2|/2,$$

wherein:
D is the offset value,
FR is the average friction torque,
FR1 is the first friction torque value, and
FR2 is the first friction torque value.

10. The electric power steering system of claim 7, wherein the processing device is further configured to measure at least one of contextual vehicle quantities simultaneously with a value of the friction torque, the vehicle contextual quantities comprising an ambient temperature, a distance traveled by the vehicle, and a duration of use of the power steering system.

11. The electric power steering system of claim 10, wherein the processing device is further configured to store the values of the friction torque acquired during the acquisition time interval, as well as the measured vehicle contextual quantity.

12. A vehicle incorporating the power steering system according to claim 7.

* * * * *